United States Patent [19]
Bruhn et al.

[11] Patent Number: 5,760,697
[45] Date of Patent: Jun. 2, 1998

[54] MULTI-CHANNEL RECORDING DEVICE

[75] Inventors: Arno Bruhn, Wülfrath; Hans-Herbert Kirste, Landesbergen; Georgios Vlachojannis, Flörsheim; Franz Kuhn, Seligenstadt; Winfried Rippert, Maintal, all of Germany

[73] Assignee: Hartmann & Braun A.G., Frankfurt, Germany

[21] Appl. No.: 736,628

[22] Filed: Oct. 24, 1996

[51] Int. Cl.$^6$ .................................. G08B 5/00
[52] U.S. Cl. .................. 340/815.4; 340/815.45; 340/815.65; 346/45; 346/55; 346/65
[58] Field of Search .............. 340/815.4, 815.44, 340/815.45, 815.65; 346/17, 45, 49, 55, 57, 65–67

[56] References Cited

U.S. PATENT DOCUMENTS

| Re. 32,108 | 4/1986 | Maxwell | 374/186 |
|---|---|---|---|
| 4,341,225 | 7/1982 | Gallant et al. | 128/710 |
| 4,779,100 | 10/1988 | Voelz | 346/33 ME |

Primary Examiner—Jeffery A. Hofsass
Assistant Examiner—Ashok Mannava
Attorney, Agent, or Firm—Michael M. Rickin

[57] ABSTRACT

A multi-channel recording device for recording the time profiles of a plurality of measurement signals which can be connected to the device. The device has first and second groups of optical indicators on the front of the device and scale strips corresponding to the physical variables to be measured. There are n indicators in the first group, m indicators in the second group and scale strips where n is greater than m. The device assigns one and only one of the m indicators to each of the n indicators.

12 Claims, 1 Drawing Sheet

MULTI-CHANNEL RECORDING DEVICE

FIELD OF THE INVENTION

This invention relates to a multi-channel device for recording the time profiles of a plurality of measurement signals which can be connected to the device.

DESCRIPTION OF THE PRIOR ART

Multi-channel recording devices for recording the time profiles of a plurality of measurement signals which can be connected to the device are known, for example, from the Hartmann & Braun AG List Sheet 40-1.10. Such devices have the normal means for transporting a recording medium and, for each measurement signal, a plotting system which is equipped with electrical drive means for moving a pen transversely with respect to the transport direction of the recording medium. Because of the plurality of recording channels, such a recording device can be equipped with a plurality of scale strips whose scale graduation can be matched to the type and dimension of the physical variable which is connected as the measurement signal to one of the recording channels. Furthermore, such recording devices regularly have means for static verbal assignment of the measurement signals to the recording channels. These means are normally represented as inscription areas assigned to the channel numbers.

In order to utilize optimally the available front area for such a recording device, its external dimensions are essentially governed by the format, in particular the width of the recording medium. The scale strips are expediently arranged in cascaded form counter to the transport direction of the recording medium. Since the visible front area of the recording device is mainly reserved for displaying the recorded measurement signals, only a small usable area is thus available for the verbal description of the physical variable of the measurement signal, which area is normally arranged opposite the scale strip, with respect to the physical area of the recording medium. In consequence, the capability for direct association of a measurement channel or of the associated physical variable to the scale strip assigned to it is lost, and this has been found to be disadvantageous. Therefore, it is desirable to develop a multi-channel recording device which is known per se, such that optical assignment of each recording channel to the scale strip corresponding to its physical variable is made possible.

SUMMARY OF THE INVENTION

A multi-channel recording device for recording the time profiles of a plurality of measurement signals which can be connected to the recording device. The recording device has at least means for transporting a recording medium, a plurality of scale strips, means for static, verbal assignment of the measurement signals to the recording channels and, for each measurement signal, a plotting system which is equipped with electrical drive means for moving a pen transversely with respect to the transport direction of the recording medium, and in which one scale strip can be assigned to each recording channel.

The recording device is characterized in that a first and a second group of optical indicating means are arranged on the front of the recording device. The first group of optical indicating means is made up of n and only n optical indicators which are each assigned to one of n recording channels. N is two or more. The second group of optical indicating means is made up of m and only m optical indicators which are each assigned to one of m scale strips. M is one or more. N is greater than m.

The recording device is further characterized in that one and only one optical indicating means of the second group can be assigned to each optical indicating means of the first group. The assignment is in such a manner that the associated scale strip can be marked for each selectable recording channel and two of the first group optical indicating means can be assigned to one of the second group optical indicating means.

A multi-channel recording device for recording the time profiles of a plurality of measurement signals which can be connected to the recording device. The recording device has at least means for transporting a recording medium, a plurality of scale strips, and, for each measurement signal, a plotting system which is equipped with electrical drive means for moving a pen transversely with respect to the transport direction of the recording medium, and in which one scale strip can be assigned to each recording channel.

The recording device is characterized in that a first and a second group of optical indicating means are arranged on the front of the recording device. The first group is made up of n and only n optical indicating means which are each assigned to one of n recording channels. N is two or more. The second group is made up of m and only m optical indicating means which are each assigned to one of m scale strips. M is one or more. N is greater than m.

The recording device is further characterized in that one and only one optical indicating means of the second group can be assigned to each optical indicating means of the first group. This assignment is in a manner that the associated scale strip can be marked for each selectable recording channel and two of the first group optical indicating means can be assigned to one of the second group optical indicating means.

DESCRIPTION OF THE PREFERRED EMBODIMENT(S)

Figure 1:
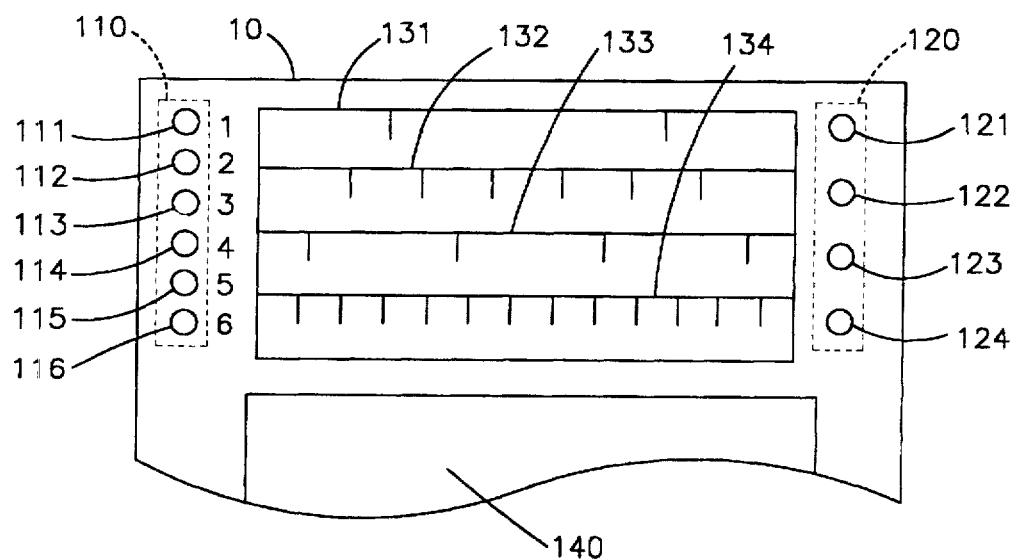
FIG. 1 shows a detail from the front area of a recording device having freely positioned indicating means of the first group.

FIG. 1 illustrates a detail from the front of a recording device 10, only those features which are essential to the invention being shown. In this embodiment, a recording device 10 is designed to record the time profiles of n=6 measurement signals. Furthermore, it is assumed for this embodiment that there are at least two physical variables which may be recorded, are connected as measurement signals, are of the identical type and cover an identical measurement range. The recording device 10 is equipped with m=4 scale strips 131 to 134 for this purpose.

The front of the recording device 10 has a viewing window 140 through which the recording medium and the information recorded on it and relating to the individual recording channels 1 to 6 can be followed. Furthermore, a first group 110 of optical indicating means 111 to 116 can provided for the n=6 recording channels 1 to 6 and may be positioned essentially freely. In this case, one and only one channel designation of the associated recording channel 1 to 6 is assigned to each indicating means 111 to 116 of the first group 110. The channel designation may be designed in alphanumeric or colored form.

One and only one optical indicating means 121 to 124 of a second group 120 of optical indicating means is physically assigned to each scale strip 131 to 134. For this embodiment, with m=4 scale strips 131 to 134, it is assumed that there are at least two physical variables which may be recorded, are connected as measurement signals, are of the identical type, for example temperature, and cover an identical measurement range. Only a single scale strip 131 to 134 is advantageously provided for such a pair of physical variables in order to be able to permit an improved read-out capability, with the same space requirement, by means of an enlarged presentation of the measurement range values.

One and only one indicating means 121 to 124 of the second group 120 is assigned to each assigned optical indicating means 111 to 116 of the first group 110, it being possible to assign a plurality of indicating means 111 to 116 of the first group 110 to each indicating means 121 to 124 of the second group 120.

The recording channels 1 to 6 can be selected individually by means of any desired selection means, which are not illustrated, the respectively assigned indicating means 111 to 116 of the first group 110, and the indicating means 121 to 124, which is assigned to the associated scale strip 131 to 134, of the second group 120 being activated. The activation of in each case one optical indicating means 111 to 116 of the first group 110 and in each case one optical indicating means 121 to 124 of the second group 120 ensures unambiguous assignment of each recording channel 1 to 6 to the associated scale strip 131 to 134. The small size of the optical indicating means 111 to 124, which are designed as light-emitting diodes, of the first group 110 and of the second group 120 advantageously makes this form of assignment display possible even in the case of miniature compact recording devices.

Figure 2:
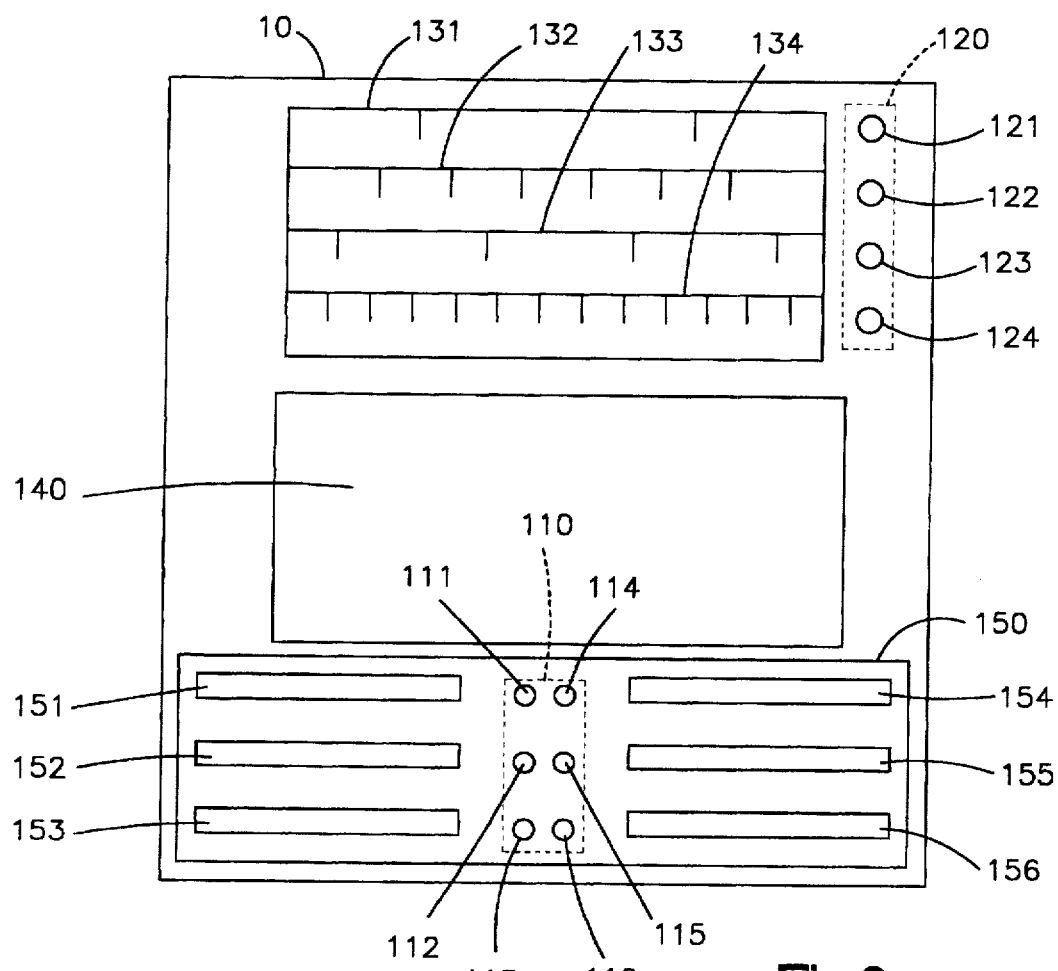
FIG. 2 shows a front view of a recording device with the indicating means of the first group being assigned to the descriptions of the physical variables.

In a second embodiment, the front of a recording device 10 is illustrated in FIG. 2, using the same reference symbols for the same means. Furthermore, means 150 for channel assignment are illustrated with respect to the window 140, opposite the scale strips 131 to 134, in the base region of the front of the recording device 10. In this case, the means 150 for channel assignment are equipped with labels 151 to 156 for n=6 recording channels which are each inscribed with a description of the physical type and/or of the process origin which is related to the measurement signal assigned to the respective recording channel 1 to 6. In this embodiment, the optical indicating means 111 to 116 of the first group 110 are integrated in the means 150 for channel assignment. At the same time, each label 151 to 156 is physically assigned to one and only one optical indicating means 111 to 116 of the first group 110.

One and only one indicating means 121 to 124 of the second group 120 is assigned to each assigned optical indicating means 111 to 116 of the first group 110, it being possible to assign a plurality of indicating means 111 to 116 of the first group 110 to each indicating means 121 to 124 of the second group 120.

The recording channels 1 to 6 can be selected individually by means of any desired selection means, which are not illustrated, the respectively assigned indicating means 111 to 116 of the first group 110, and the indicating means 121 to 124, which is assigned to the associated scale strip 131 to 134, of the second group 120 being activated. The activation of in each case one optical indicating means 111 to 116 of the first group 110 and in each case one optical indicating means 121 to 124 of the second group 120 ensures unambiguous assignment of each recording channel 1 to 6 to the associated scale strip 131 to 134. The small size of the optical indicating means 111 to 124, which are designed as light-emitting diodes, of the first group 110 and of the second group 120 advantageously makes this form of assignment display possible even in the case of miniature compact recording devices.

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. Multi-channel recording device for recording the time profiles of a plurality of measurement signals which can be connected, which recording device has at least means for transporting a recording medium, a plurality of scale strips, means for static, verbal assignment of the measurement signals to the recording channels and, for each measurement signal, a plotting system which is equipped with electrical drive means for moving a pen transversely with respect to the transport direction of the recording medium, and in which one scale strip can be assigned to each recording channel, characterized in that a first and a second group (110, 120) of optical indicating means (111 to 12m) are arranged on the front of the recording device (10), the first group (110) comprising n and only n optical indicating means (111 to 11n) which are each assigned to one of n recording channels (1 to n), wherein n is two or more, and the second group (120) comprises m and only m optical indicating means (121 to 12m) which are each assigned to one of m scale strips (131 to 13m), wherein m is one or more and n is greater than m, in that one and only one optical indicating means (121 to 12m) of the second group (120) can be assigned to each optical indicating means (111 to 11n) of the first group (110) in such a manner that the associated scale strip (131 to 13m) can be marked for each selectable recording channel (1 to n) and two of said first group optical indicating means can be assigned to one of said second group optical indicating means.

2. Recording device according to claim 1, characterized in that the optical indicating means (111 to 12m) are light-emitting diodes.

3. Recording device according to claim 1, characterized in that the optical indicating means (111 to 11n) of the first group (110) are assigned to the means (150) for static, verbal assignment of the measurement signals to the recording channels (1 to n).

4. Recording device according to claim 2, characterized in that the optical indicating means (111 to 11n) of the first group (110) are assigned to the means (150) for static, verbal assignment of the measurement signals to the recording channels (1 to n).

5. Multi-channel recording device for recording the time profiles of a plurality of measurement signals which can be connected, which recording device has at least means for transporting a recording medium, a plurality of scale strips, and, for each measurement signal, a plotting system which is equipped with electrical drive means for moving a pen transversely with respect to the transport direction of the recording medium, and in which one scale strip can be assigned to each recording channel, characterized in that a first and a second group (110, 120) of optical indicating means (111 to 12m) are arranged on the front of the recording device (10), said first group (110) comprising n and only n optical indicating means (111 to 11n) which are each assigned to one of n recording channels (1 to n), wherein N is two or more, and said second group (120) comprising m and only m optical indicating means (121 to 12m) which are each assigned to one of m scale strips (131 to 13m), wherein m is one or more and n is greater than m, in that one and only one optical indicating means (121 to 12m) of said second group (120) can be assigned to each optical indicating means (111 to 11n) of said first group (110) in such a manner that said associated scale strip (131 to 13m) can be marked for each selectable recording channel (1 to n) and two of said first group optical indicating means can be assigned to one of said second group optical indicating means.

6. Recording device according to claim 5, characterized in that said first group optical indicating means (111 to 12m) are light-emitting diodes.

7. Recording device according to claim 5, characterized in that said recording channels (1 to n) are designated with a channel designation such that they cannot be confused, and said first group optical indicating means (111 to 11n) are arranged in a row and are each marked with the channel designation of said associated recording channel (1 to n).

8. Recording device according to claim 6, characterized in that said recording channels (1 to n) are designated with a channel designation such that they cannot be confused, and said first group optical indicating means are arranged in a row and are each marked with the channel designation of said associated recording channel (1 to n).

9. Recording device according to claim 5 further including means for static, verbal assignment of the measurement signals to said recording channels.

10. Recording device according to claim 9, characterized in that said first group mean optical indicating means (111 to 11n) are assigned to said means (150) for static, verbal assignment of the measurement signals to said recording channels (1 to n).

11. Recording device according to claim 6 further including means for static, verbal assignment of the measurement signals to said recording channels.

12. Recording device according to claim 11, characterized in that said first group mean optical indicating means (111 to 11n) are assigned to said means (150) for static, verbal assignment of the measurement signals to said recording channels (1 to n).

* * * * *